United States Patent
Bergmanis et al.

[15] 3,694,742
[45] Sept. 26, 1972

[54] DEVICE FOR MEASURING PERMITTIVITY OF MATERIALS

[72] Inventors: Karlis Alfredovich Bergmanis, ulitsa Graudu, 15, kv. 1; Erik Ernestovich Klotinish, ulitsa Tvaiku, 54, Korpus 4, kv. 19; Imant Gustovich Matis, ulitsa Laimdotas, 61, kv. 19, all of Riga, U.S.S.R.

[22] Filed: July 15, 1970

[21] Appl. No.: 55,025

[52] U.S. Cl. .................................. 324/61 QS
[51] Int. Cl. .................................. G01r 27/26
[58] Field of Search .................... 324/61, 61 TI

[56] References Cited

UNITED STATES PATENTS 3,400,331    9/1968    Harris ...................... 324/61

*Primary Examiner*—Alfred E. Smith
*Attorney*—Holman & Stern

[57] ABSTRACT

A device for measuring permittivity of materials on the basis of at least two different measured capacitance values of a capacitor connected to the material being tested and to a measuring oscillator the output of which is coupled to the input of a frequency meter in the form of a series combination of a switch and a pulse counter with a resetting unit, said capacitor being formed by at least two main electrodes permanently connected to the input of said measuring oscillator, and one additional electrode which is alternately connected by a changeover switch to one of said main electrodes in the course of measurement, while said resetting unit is connected to said pulse counter in the form of a reversible counter by an on-off switch actuated synchronously with said switch of the measured capacitor electrodes, the direction of counting of said reversible counter being determined by the position of said changeover switch of the measured capacitor electrodes.

2 Claims, 1 Drawing Figure

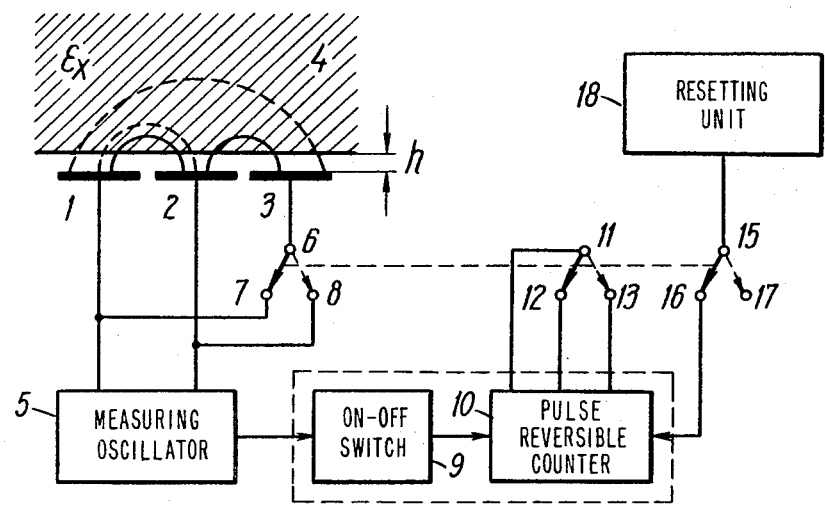

DEVICE FOR MEASURING PERMITTIVITY OF MATERIALS

The present invention relates to electric measurement techniques and more particularly to devices for measuring permittivity of various materials.

There exist devices for measuring permittivity of materials comprising: capacitance measuring electrodes connected to the material being tested and to a measuring oscillator. The output of the measuring oscillator and the output of a reference oscillator are coupled to two inputs of a frequency mixer whose output is coupled to the input of a reversible counter through a switch.

The measure capacitance changes depending on the dielectric properties of the tested material and, in doing so, varies the frequency of the measuring oscillator, which upon conversion in the mixer is measured by a frequency meter formed by a series combination of a switch and a reversible counter.

However, the existing devices for permittivity measurement are disadvantageous in that the measured capacitance and consequently, the measured measurement depend not only upon the dielectric properties of the tested material but also on the quality of the contact between its electrodes and the surface of the tested material. If an air gap is present between the contact surfaces, or if the surface of the tested material has irregularities preventing tight contact between the surface and the electrodes of the measuring capacitor the permittivity measurement is accompanied by a large error. Therefore, a high accuracy of frequency measurement featured by the reversible pulse counter remains unutilized. Besides, the use of a reference oscillator and of a mixer complicates the equipment and handicaps application of the device when the working frequencies have to be changed. When operating with several working frequencies the frequency of the reference oscillator must be changed along with the frequency of the measuring oscillator.

An object of the present invention is to obviate these disadvantages; it will be noted that a capacitor formed in the device of the invention between two measuring electrodes and a material of permittivity to be tested is hereinafter referred to as the "measuring capacitor".

A particular object of the present invention is to provide a device for permittivity measurement which is capable of operating at different working frequencies, displays the measurement results in the digital form and makes it also possible to eliminate the effect of the gap or imperfect contact between any electrodes of the measuring capacitor and the surface of the tested material.

With this object in view the device for measuring permittivity of materials on the basis of at least two capacitance values of a measuring capacitor connected to the material being tested and to a measuring oscillator whose output is coupled to the input of a frequency meter in the form of a series combination of a switch and a pulse counter with a resetting unit is, according to the invention, so designed that the measuring capacitor has at least two main electrodes permanently connected to the input of the measuring oscillator and one additional electrode alternately connectible by a changeover switch to one of said main electrodes in the course of measurement, while said resetting unit is connected to the pulse counter designed as a reversible counter through an on-off switch actuated synchronously with the changeover switch on the measuring capacitor electrodes, the direction of counting of said reversible counter being determined by the position of the changeover switch of the measuring capacitor electrodes.

The invention will be best understood from the following description of its specific embodiment when read in connector with the accompanying drawing which shows the block diagram of a device for measuring permittivity of materials, according to the invention.

The device for measuring permittivity comprises a measuring capacitor formed by main electrodes 1 and 2 and an additional electrode 3 which are connected to a material 4 being tested. The main electrodes 1 and 2 are permanently connected to a measuring oscillator 5, while the additional electrode 3 is connected by a changeover switch 6 to the main electrode 1 in the switch position 7 and to the main electrode 2 in the switch position 8. The output of the measuring oscillator 5 is coupled through an on-off switch 9 to the input of a reversible counter 10. The changeover switch 6 is actuated synchronously with a counting direction switch 11 of the reversible counter 10. In the position 12 of the counting switch 11 the reversible counter 10 is connected for addition, in the position 13, for subtraction. The switches 6 and 11 are actuated synchronously with a change-over switch 15, in the position 16 of which a resetting unit 18 is connected to, and in the position 17 is disconnected from, the reversible counter 10.

The device operates as follows.

The entire measurement cycle is made up of two operations:

1. The measuring electrodes 1, 2 and 3 are applied to the material 4 to be tested. The changeover switch 6 is set to the position 7 in which the additional electrode 3 is connected to the main electrode 1. An electric field is produced in the material 4, the lines of force of which are shown by solid lines in the drawing. The capacitance connected in this case to the measuring oscillator 5 can be written to a first approximation in the form:

$$C_1 = C_{01} + \frac{\partial C_1}{\partial \epsilon}\bigg|_{\epsilon=1}(\epsilon-1) + \frac{\partial C_1}{\partial h}\bigg|_{h=0} h \quad (1)$$

where $C_{01}$ is the capacitance value of the measuring capacitor connected to the measuring oscillator 5 in the absence of the tested material 4, with the changeover switch 6 in the position 7;

$\epsilon$ is the relative permittivity of the tested material 4;

$h$ is the air gap between the electrodes and the tested material.

The frequency of the measuring oscillator 5 corresponding to the capacitance given by the equation (1) can be similarly written in the form:

$$f_1 = f_{01} + \frac{\partial f_1}{\partial \epsilon}\bigg|_{\epsilon=1}(\epsilon-1) + \frac{\partial f_1}{\partial h}\bigg|_{h=0} h \quad (2)$$

where $f_{01}$ is the frequency of the measuring oscillator 5 in the absence of the tested material 4, with the switch 6 in the position 7.

The frequency $f_1$ is measured by the reversible counter 10, which at the moment operates for addition as the switch 11 is in the position 12. The code set on the reversible counter 10 is proportional to the frequency $f_1$ and the measurement time $t_u$.

$$u_1 = t_u \left[ f_0 + \frac{\partial f_1}{\partial \epsilon} \bigg|_{\epsilon=1} (\epsilon - 1) + \frac{\partial f_1}{\partial h} \bigg|_{h=0} h \right] \quad (3)$$

During the first operation the change-over switch 15 is in the position 16 in which the resetting unit 18 is connected to the reversible counter 10. Consequently, before the reversible counter 10 is started and accepts a new code the previous reading is reset.

2. The changeover switch 6 is operated to the position 8 in which the additional electrode 3 is connected to the main electrode 2. An electric field is produced in the tested material 4, whose lines of force are shown by a dotted line in FIG. 1. The capacitance which is connected in this case to the measuring oscillator 5 can be written in the form:

$$C_2 = C_{02} + \frac{\partial C_2}{\partial \epsilon} \bigg|_{\epsilon=1} (\epsilon - 1) + \frac{\partial C_2}{\partial h} \bigg|_{h=0} h \quad (4)$$

where $C_{02}$ is the capacitance of the measuring capacitor connected to the measuring oscillator 5 in the absence of the tested material 4, with the change-over switch 6 in the position 8.

The frequency of the measuring oscillator corresponding to the capacitance given by the equation (4) can be written in the form:

$$f_2 = f_{02} + \frac{\partial f_2}{\partial \epsilon} \bigg|_{\epsilon=1} (\epsilon - 1) + \frac{\partial f_2}{\partial h} \bigg|_{h=0} h \quad (5)$$

where $f_{02}$ is the frequency of the measuring oscillator 5 in the absence of the tested material 4, with the change-over switch 6 in position 8.

During the second operation the reversible counter 10 performs the subtraction as the switch 11 is in the position 13. The resetting unit 18 is disconnected from the reversible counter 10 as the change-over switch 15 is in the position 17. Consequently, when the reversible counter 10 is started the previous code $N_1$ is not reset and the following code is subtracted from the previous code $N_1$:

$$N_2 = t_u \left[ f_{02} + \frac{\partial f_2}{\partial \epsilon} \bigg|_{\epsilon=1} (\epsilon - 1) + \frac{\partial f_2}{\partial h} \bigg|_{h=0} h \right] \quad (6)$$

This marks the end of the two operations. Now the reversible counter 10 has the resulting code equal to the difference between the codes $N_1$ and $N_2$:

$$N = N_1 - N_2$$
$$= t_u \left[ f_{01} + \frac{\partial f_1}{\partial \epsilon} \bigg|_{\epsilon=1} (\epsilon-1) \frac{\partial f_1}{\partial h} \bigg|_{h=0} h - f_{02} - \frac{\partial f_2}{\partial \epsilon} \bigg|_{\epsilon=1} (\epsilon-1) - \frac{\partial f_2}{\partial h} \bigg|_{h=0} h \right]$$

In order to eliminate the effect of the air gap $h$ in the measurement result, the sensitivity of the measuring capacitor to the air gap $h$ must be equal in both positions of the switch 6, i.e.:

$$\frac{\partial f_1}{\partial h} \bigg|_{h=0} = \frac{\partial f_2}{\partial h} \bigg|_{h=0} \quad (8)$$

If the condition (8) is observed, the resultant code according to the equation (7) is equal to:

$$N = t_u \left[ f_{01} - f_{02} + \left( \frac{\partial f_1}{\partial \epsilon} \bigg|_{\epsilon=1} - \frac{\partial f_2}{\partial \epsilon} \bigg|_{\epsilon=1} \right) (\epsilon - 1) \right] \quad (9)$$

The expression (9) shows that the component of the air gap $h$ does not enter in the measurement result. Consequently, the measurement of permittivity is unaffected by the size of the air gap and thus the desired object is achieved.

The first addend in the equation (9) corresponds to the counter reading in the absence of the tested material, at the air permittivity = 1. The multiplier of the second addend:

$$\frac{\partial f_1}{\partial \epsilon} \bigg|_{\epsilon=1} - \frac{\partial f_2}{\partial \epsilon} \bigg|_{\epsilon=1}$$

corresponds to the difference in the sensitivity of the measuring capacitor to permittivity in both positions of the changeover switch 6.

Owing to the fact that the resultant code (9) is obtained as the difference between two frequencies of the measuring oscillator 5 corresponding to two capacitance values of the measuring capacitor the effects of spurious capacitances of the electrodes 1, 2 and 3 and of the frequency drift of the measuring oscillator 5 is cancelled out in the final measurement result. This can be easily seen by inserting the component of the spurious capacitances in the initial equations (1) and (2) or the frequency drift component in the equations (2) and (5) in which these interfering factors have a similar sign. However, in the resulting code (7) the components of the spurious capacitances and frequency drift have the opposite signs and, consequently, are cancelled out in the measurement result. This increases the accuracy of the measurement.

In the above discussion during the first operation the reversible counter operated for addition, during the second operation, for subtraction. However, for unambiguous determination of permittivity this condition is not obligatory. The sign of the two addends in the equation (9) is likewise immaterial. Nonetheless, the following condition has to be observed in order that the measurement results are displayed directly in the digital code indicative of permittivity at all discrete working frequencies of the device $$f_{01} - f_{02} = 10^n h \frac{\partial f_1}{\partial \epsilon} \bigg|_{\epsilon=1} - \frac{\partial f_2}{\partial \epsilon} \bigg|_{\epsilon=1} = 10 \quad (10)$$

where $10^n$ is the reading of the counter after the decimal point, indicative of permittivity, is the number of the digits in the counter indicative of permittivity.

By appropriately modifying the conditions (5) and (6) the device described herein can be used for measuring any parameter with elimination of the effect produced by the other parameter, the two parameters representing any possible combination of the dielectric and geometrical properties of the article being tested. For example, it is possible to measure the permittivity of a film material with elimination of the effect produced by its thickness or to check a double-layer material with elimination of the effect produced by the permittivity or thickness of one layer, etc. The examples given above in which the device was used with a solid dielectric do not mean that the device cannot be used with other types of material, such as liquids or powder.

The advantages of the device described herein over the existing devices are due, first, to the use of a unique measuring capacitor applied to the material being tested and featuring a selective sensitivity to permittivity and to the gap between the surface of this capacitor and the surface of the tested material. This enables the electric properties of a material to be tested in the article itself, without causing its destruction, making samples or having to comply with special requirements to the quality of the contact between the measuring capacitor and the surface of the article being tested. Second, the measuring set-up depends for its operation on the most effective physical phenomenon—the electrical resonance—which imparts a maximum sensitivity and a high speed of action to the device. The high sensitivity of the device enables the use of a small-size pick-up while its high speed of action makes it possible to employ the methods of technical cybernetics for improving the measuring accuracy.

Third, owing to the fact that the parameter which carries the information about the unknown quantity is the frequency of an electric signal, the effect of the wires connecting the measuring capacitor with the rest of the equipment is completely eleminated. Therefore the measuring capacitor can be mounted directly where the measurement is carried out, with the tested article left in its place.

Fourth, the device described herein is free from the disadvantages of the prior art devices owing to the use of a special algorithm for processing the measurement results in the device itself. The measurement result is unaffected not only by the quality of the contact between the measuring capacitor and the surface of the article but also by the errors caused by the unstability of the measuring set-up components at varying ambient conditions. Therefore, when using this device there is no need either to zero the indicator or to periodically check it, which makes the device suitable for use in automatic control systems.

Fifth, the high speed of action, ease of maintenance and possibility of connection of a printing facility makes it possible to reduce the accidental measurement errors by resorting to statistical processing of the results of multiple measurements. If necessary, the measurement results can be directly fed to an electronic computer. No additional calculations are required as the measurement results are automatically processed in the device itself, which, besides, features a high speed of action due to the use of a pulse-type measuring set-up.

The measurement results are displayed in a digital form indicative of permittivity.

Also noteworthy is the wide field of application of this device, which can be provided with changeable pick-ups for testing the same parameters under different conditions or for testing other parameters, e.g. for measuring permittivity with elimination of the effect produced by the thickness of the material, for measuring permittivity of a film material with elimination of the effect produced by the change in its permittivity or by the thickness of its base, for measuring the thickness of a dielectric layer with elimination of the effect produced by its permittivity.

What is claimed is:

1. A device for measuring permittivity of a material, comprising first and second electrodes to be applied to said material to measure a capacitance formed thereby; a measuring oscillator coupled to said first and second electrodes to measure the capacitance formed thereby; a third electrode to be applied to said materials, said third electrode being identical with and additional to said first and second electrodes; a changeover switch means operable between first and second positions to respectively connect said additional electrode electrically in parallel with said first and second electrodes during measurement; and means connected to the oscillator output to measure the difference between a first value of capacitance measured in said first position of said changeover switch means, said first value of capacitance being that existing between the electrically paralleled first and third electrodes, and said second electrode, and a second value of capacitance measured in said second position of said changeover switch means between the first electrode and electrically paralleled second and third electrodes, whereby the permittivity of the material to be measured is computed from the difference between the first and second measured values of capacitance to eliminate any errors due to improper contact of the electrodes with the material.

2. The device as claimed in claim 1, wherein said means connected to the oscillator output comprises in series connection with said measuring oscillator a switch, a reversible pulse counter and a re-setting unit connected through a second change-over switch, the device including means to display the measured difference between the first and second values of capacitance to indicate permittivity of the material in a digital form.

* * * * *